(12) United States Patent
Zakula, Sr. et al.

(10) Patent No.: US 7,344,037 B1
(45) Date of Patent: *Mar. 18, 2008

(54) INVENTORY STORAGE AND RETRIEVAL SYSTEM AND METHOD WITH GUIDANCE FOR LOAD-HANDLING VEHICLE

(75) Inventors: Daniel Brian Zakula, Sr., Mokena, IL (US); Harvey E. Schmidt, Flossmoor, IL (US)

(73) Assignee: Mi-Jack Products, Inc., Hazel Crest, IL (US)

( * ) Notice: Subject to any disclaimer, the term of this patent is extended or adjusted under 35 U.S.C. 154(b) by 386 days.

This patent is subject to a terminal disclaimer.

(21) Appl. No.: 10/892,027

(22) Filed: Jul. 15, 2004

Related U.S. Application Data

(63) Continuation-in-part of application No. 10/298,487, filed on Nov. 18, 2002, now Pat. No. 7,032,763.

(60) Provisional application No. 60/487,436, filed on Jul. 15, 2003.

(51) Int. Cl.
*B66C 19/00* (2006.01)

(52) U.S. Cl. .................. 212/344; 212/270; 701/41; 701/44

(58) Field of Classification Search ............... 212/270, 212/344; 701/2, 41, 44, 50
See application file for complete search history.

(56) References Cited

U.S. PATENT DOCUMENTS

| | | | |
|---|---|---|---|
| 4,973,219 A | * | 11/1990 | Brickner et al. .......... 414/792.9 |
| 5,512,902 A | | 4/1996 | Guthrie et al. |
| 5,780,826 A | * | 7/1998 | Hareyama et al. .......... 235/385 |
| 5,923,270 A | | 7/1999 | Sampo et al. |
| 6,062,403 A | | 5/2000 | Baumann et al. |
| 6,266,008 B1 | | 7/2001 | Huston et al. |
| 6,577,921 B1 | * | 6/2003 | Carson ....................... 700/214 |
| 6,768,931 B2 | * | 7/2004 | Takehara et al. ............ 700/225 |
| 2002/0046142 A1 | | 4/2002 | Ishikura |
| 2002/0070891 A1 | | 6/2002 | Huston et al. |
| 2005/0033514 A1 | * | 2/2005 | Lu .............................. 701/213 |

FOREIGN PATENT DOCUMENTS

WO    WO 98/34127 A1    8/1998

\* cited by examiner

*Primary Examiner*—Thomas J. Brahan
(74) *Attorney, Agent, or Firm*—Drinker Biddle & Reath LLP

(57) ABSTRACT

An inventory storage and retrieval system and method are provided for a shipping or storage facility. In an embodiment, the system includes: (a) a mobile computer and radio on a load-handing vehicle; (b) sensors on the vehicle to determine the ground location and orientation of the vehicle; (c) encoders that determine the position of a lifting mechanism relative to a chassis of the vehicle; and (d) a base computer and radio that communicates with the vehicle. The system maintains an inventory database of items and their respective storage locations in three dimensions as a result of the loading activity of the vehicle. The data can be used to guide the vehicle for ground movement generally to a storage location, appropriately orient the vehicle, and then to move the lifting mechanism of the vehicle to deposit or retrieve the item at a particular storage location.

8 Claims, 7 Drawing Sheets

INVENTORY STORAGE AND RETRIEVAL SYSTEM AND METHOD WITH GUIDANCE FOR LOAD-HANDLING VEHICLE

CROSS-REFERENCE TO RELATED PATENT APPLICATIONS

This patent application is a continuation-in-part of copending U.S. patent application Ser. No. 10/298,487, filed Nov. 18, 2002, and this patent application claims the benefit of U.S. Provisional Patent Application No. 60/487,436 filed Jul. 15, 2003.

FIELD OF THE INVENTION

This invention generally pertains to vehicle guidance systems and more particularly relates to a system for guiding a vehicle to deposit and retrieve items in conjunction with inventory tracking data.

BACKGROUND OF THE INVENTION

A guidance system for a gantry crane is disclosed in U.S. patent application Ser. No. 10/298,487, incorporated herein by reference in its entirety. The guidance system of that application uses GPS technology to determine the ground position and orientation of a gantry crane, thereby providing directional data useful for automatically or manually driving a vehicle such as a gantry crane to a desired location.

Various load handling systems are known, such as those disclosed in U.S. Pat. Nos. 5,512,902, 6,266,008, and 6,577,921, and in International Publication No. 98/34127.

A need exists for an improved system and method for utilizing a guided vehicle to handle items in an inventory.

BRIEF SUMMARY OF THE INVENTION

The present application relates to an inventory storage and retrieval system that utilizes one or more coordinate systems for tracking storage locations and items associated with those locations. The location information is used to guide a load-handling vehicle to a particular item. Moreover, the location information is used to manage inventory data that is updated as items are deposited or retrieved from the locations with the vehicle.

The system manages an inventory of items respectively stored at predetermined positions within a storage facility defined by three-dimensional coordinates. The system keeps track of the location of each item with such coordinates. The location information may be used to guide a load-handling vehicle for depositing and retrieving the items. The system is particularly useful for managing and moving shipping containers stored in a stacked manner within a shipping facility, wherein the loading vehicle is a land-traveling unit (e.g., a gantry crane, packer, side loader, forklift, etc.) or a rail-traveling unit.

To track the inventory, the system uses a combination of GPS and other sensor technology on the load handing vehicle to assist in guiding the vehicle to an appropriate ground position and to allow precise positioning of a vertically-movable lifting member of the vehicle, for example a grappler or spreader of a gantry crane, or an extendible grappler of a side-loader style vehicle. According to various embodiments, the system is programmed to supplement the GPS position data with predetermined parameters (fixed dimensions of the vehicle, etc.) as well as encoder data that reflects the position of the lifting device on the vehicle, resulting in an accurate grappler and container position. Of course, the system may be adapted for various types of load-handling vehicles, which may have different types of encoder devices.

More specifically, the GPS data represents a position of a GPS receiver mounted to a fixed point on a main portion of the loading vehicle (e.g., the GPS receiver may be mounted to a beam or cab of a gantry crane). However, the true position of an item held by the loading vehicle is determined by the position of a lifting device of the vehicle. The lifting device is movable relative to a main portion or chassis of the vehicle. Encoders are used to determine the position of the lifting device relative to the main portion of the vehicle. Separate encoders are provided for each degree of freedom. For example, in a side loader or packer, in which the lifting device is vertically movable relative to the main portion, the encoder determines a supplemental Z distance of the lifting device relative to the GPS receiver(s). In a vehicle wherein the lifting device is movable in a side-to-side and/or front-to-rear direction, respective encoders are provided to measure supplemental X and Y distances of the lifting device with respect to a predetermined point, such as the GPS receiver(s). The encoders may be any appropriate type of encoder or sensor for example, mechanical, magnetic, or optical. These encoders can, for example, measure the degree of actuation of a cylinder or a feed distance of a cable.

In an embodiment, another factor in determining the actual position of an item is data representing the orientation of the loading vehicle. Based on the vehicle orientation, the system adjusts for known structural parameters of the loading vehicle to determine the position of the item with respect to the GPS receiver(s). For example, in a system wherein the lifting device is mounted on a particular side of the vehicle, the lifting device may be at a fixed horizontal position relative to the GPS receiver(s), and the orientation information permits the system to determine the precise position of the lifting device (and therefore a container) with respect to the ground. Orientation information may be determined by the use of multiple, horizontally spaced GPS receivers. Alternatively, orientation information may be determined by other appropriate means, such as a compass, gyroscope, particularly in a system wherein the vehicle includes a single GPS receiver. Orientation data may be unnecessary in a system wherein the orientation of the vehicle is known, such as for certain loading vehicles maintains a fixed orientation with respect to rails.

In an embodiment, the system keeps track of whether an item is in a stationary mode for storage or in transit. For example, the system determines whether a container is "unlatched" or "latched" with respect to a grappler of the loading vehicle. While the container is "unlatched," the system stores a record of the position of the container, which remains stationary at a position last deposited (switched from "latched" to "unlatched") by the vehicle. If the container is "latched," the position of the container is being moved to a destination location, and the system stores an updated position for the container where it is deposited at the moment it is "unlatched" from the loading vehicle.

Various configurations are possible, such as those described in the following examples.

In a system used with a loading vehicle having a land-traveling traveling configuration, at least one GPS receiver can be used to track positions along two dimensions (e.g., X and Y). Other encoders or sensors are implemented to supplement the GPS data to reflect the position of the lifting device relative to the GPS receiver. For example, an encoder can be used to determine position in a height dimension (Z). The system determines orientation, such as by the relative positions of multiple GPS receivers or through a dedicated orientation sensor (compass, etc.).

Where the loading vehicle is a rail-traveling unit, a GPS receiver needs only to track positions along one dimension (e.g. X), because the rail is fixed in a known position.

The hardware includes at least one GPS antenna and receiver, wireless radio, electronic controller, on board server, and ground station. The software enables the operation of the hardware for purposes of position and control. The software may include operating programs, utility programs, conversion programs, and language processors including compilers, assemblers, and translators.

The system generates an output that indicates a position relative to a local coordinate system based on a "Latch" or "Unlatch" activity:

| X position | 6 places in tenths of feet |
| Y position | 4 places in tenths of feet |
| Z position | 4 places in tenths of feet |

In an embodiment, a variation of the system uses the container location coordinates for guiding movement of the loading vehicle.

In an embodiment, an advantage of the present invention is that it provides an improved system and method for tracking an inventory.

A further advantage of the present invention is that it provides an improved system and method for guiding load-handling vehicles in an environment with tracked items.

Yet another advantage of the present invention is that it provides an accurate system and method of determining a location of a lifting device of a load-handling vehicle.

These and other advantages of the invention will be apparent from the description of the invention provided herein.

DETAILED DESCRIPTION OF THE INVENTION

The following examples further illustrate the invention but, of course, should not be construed as in any way limiting its scope.

Figure 1:
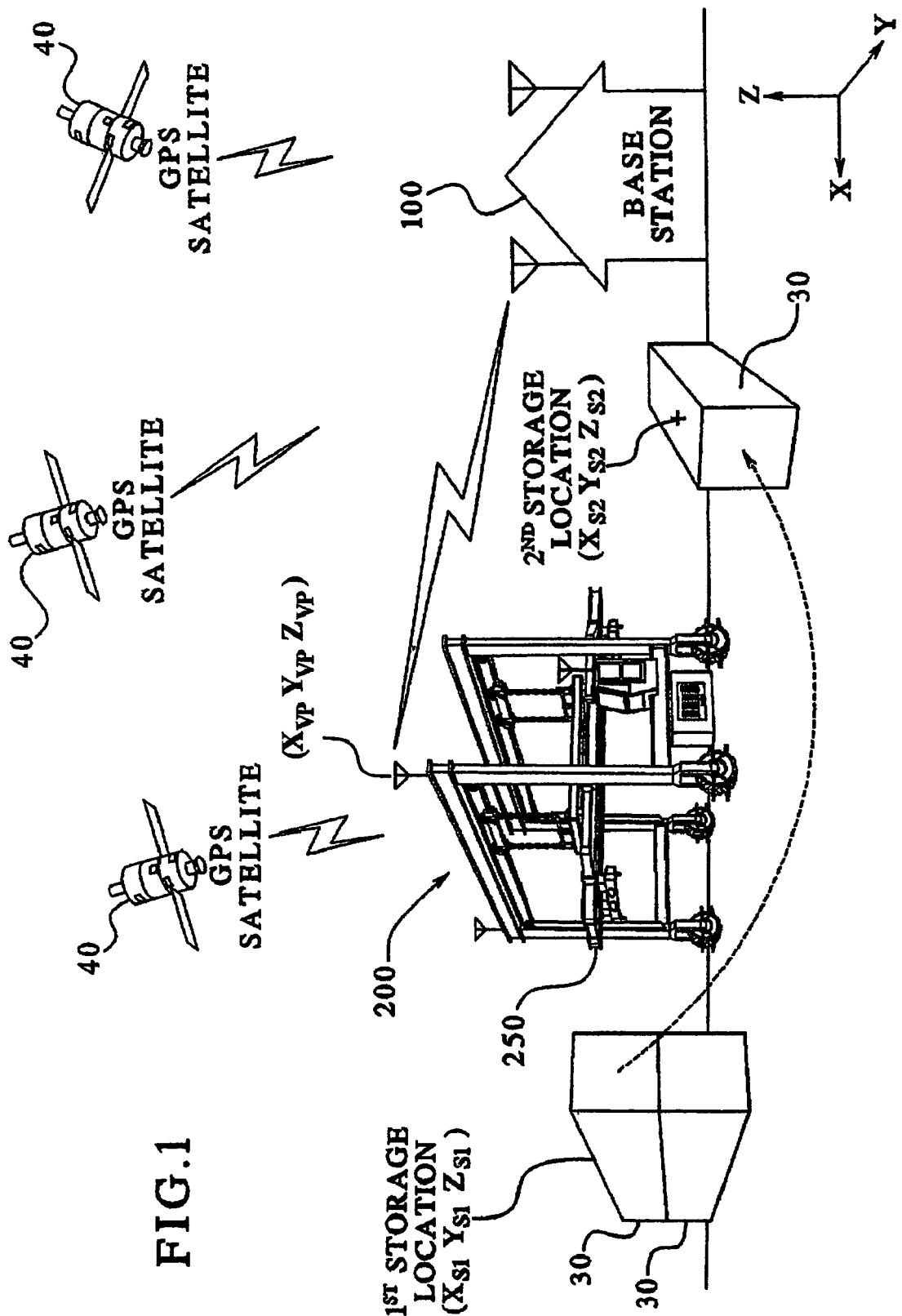
FIG. 1 is a schematic view of a load-handling vehicle on the ground with relation to a base station and a plurality of orbiting global positioning satellites.

Referring to FIG. 1, a storage facility is illustrated having a base station 100, at least one load-handling vehicle 200 that travels on the ground, and a plurality of items 30 located at various storage locations in the facility. A three-dimensional matrix is used for determining the locations of the vehicle 200 and items relative to axes X, Y, and Z. For example, as shown in FIG. 1, an actual storage location of an item is indicated as $X_S$, $Y_S$, $Z_S$, and a present ground position of the vehicle is $X_{VP}$, $Y_{VP}$, $Z_{VP}$. A plurality of orbiting global positioning satellites 40 is illustrated.

The vehicle 200 has a movable lifting device 250 that is configured to lift at least one of the items 30. The items 30 illustrated herein are standard shipping containers of a generally known type, which have latching structures located at the respective upper corners of each container. The lifting device 250 includes four twistlocks operable to selectively latch and unlatch the item 30. The invention herein will be described to the illustrated example, however, it will be understood that the invention may be used with an inventory of any type of corresponding vehicle, lifting device, and item. For example, in various embodiments, the lifting device may a spreader for lifting an item such as a truck trailer, or the vehicle could be a forklift. Those skilled in the art will also recognize that the items 30 may be placed in storage locations on the ground, stacked on top of each other, or vertically arranged on racks or shelves.

To demonstrate the versatility of the invention to various environments, the figures herein illustrate load-handling vehicles having different configurations. For example, FIG. 2 illustrates a load-handling vehicle 200A configured as a rubber tire gantry crane, and FIG. 3 illustrates a load-handling vehicle 200B in a configuration known as a side loader.

Figure 2:
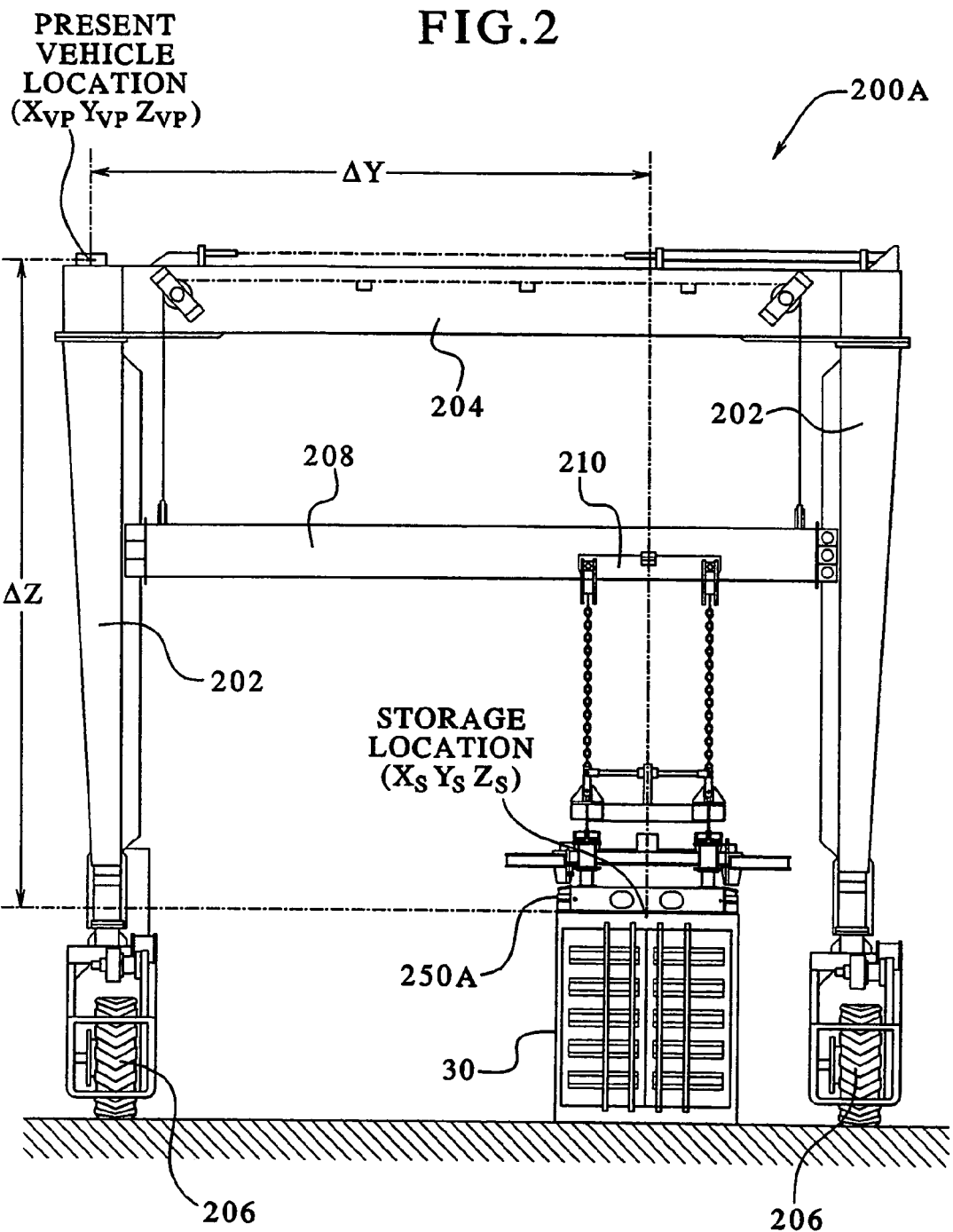
FIG. 2 is a rear elevation of a rubber tire gantry crane suitable for use a load-handling vehicle according to teachings of the present invention.

The gantry crane vehicle 200A of FIG. 2 includes a frame or chassis comprising vertical columns 202 connected by horizontal beams 204. The chassis is mounted on wheels 206 operable to drive and maneuver the vehicle 200A on the ground. The vehicle 200A includes a lifting device 250A configured as a grappler for lifting standard shipping containers. The exemplary vehicle 200A includes a vertically-movable stabilizer beam 206. The lifting device 250A is suspended from the stabilizer beam 208 by a trolley 210 that is mounted for horizontal movement transversely along the stabilizer beam 208. As a result, the lifting device 250A is movable relative to the chassis in horizontal and vertical directions.

Figure 3:
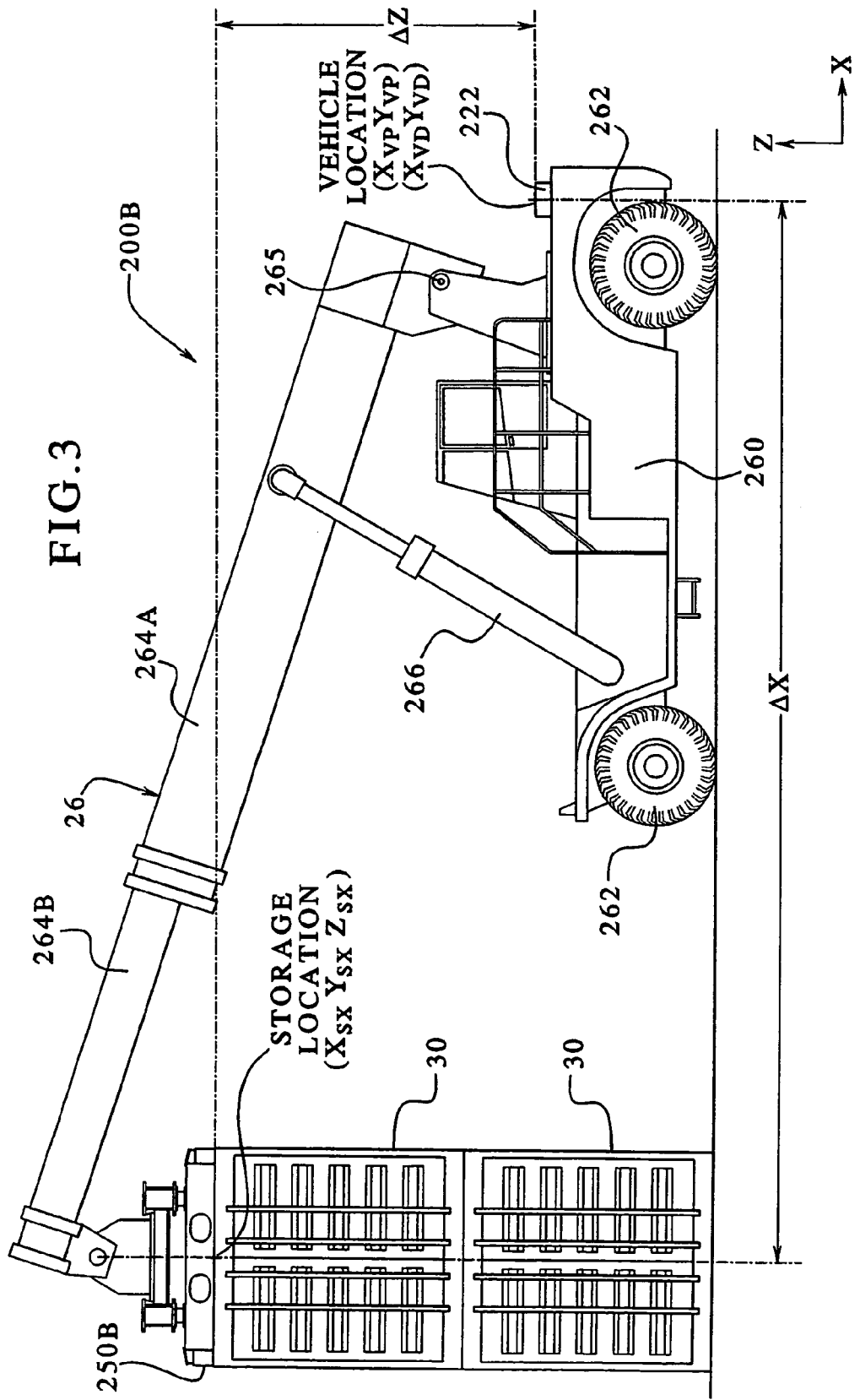
FIG. 3 is a side elevation of a side loader suitable for use as a load-handling vehicle according to teachings of the present invention.

The side loader vehicle 200B of FIG. 3 includes a chassis 260 that is equipped with wheels 262 for driving and maneuvering the vehicle on the ground. The vehicle 200B also includes a lifting device 250B mounted on a boom 264. As illustrated, the lifting device 250B is configured to latch standard shipping containers. The boom 264 is pivotally and telescopically movable for adjusting the vertical and horizontal position of the lifting device 250B relative to the chassis 260. More particularly, the boom 264 includes a first boom portion 264A that is pivotally mounted to the chassis 260 at a trunnion 265 and a second boom portion 264B that is telescopically extendible from the first boom portion 264A. At least one linear actuator 266 is provided for actuating pivotal motion of the first boom portion 264A. A linear actuator (not shown) is also provided for extending the second boom portion 264B relative to the first boom portion 264A.

According to an aspect of the present invention, an inventory database is maintained by tracking the locations of items moved by the load-handling vehicle. The load-handling vehicle utilizes a combination of GPS and other sensor technology to provide precise position of the lifting device within a three dimensional matrix defined by X, Y, and Z coordinates of a storage area or facility. More particularly, one or more GPS receivers detect a general position of the vehicle, and the position of the lifting device is determined by detecting the current position of lifting device on vehicle and supplementing the general vehicle location to reflect the position of the lifting device position on the vehicle. The GPS data is also used for guiding the vehicle to maneuver to a desired location. The vehicle has a mobile computer that communicates via RF with a base computer at the base station which updates the database pursuant to loading and unloading activity. Accordingly, the database stores current information reflecting the X, Y, and Z storage location coordinates of items stored at the facility, which location information may be used to accurately guide the vehicle to retrieve or deposit selected items. In an embodiment, the database further stores identification data that is unique per each of the items. Also, in an embodiment, the database also stores orientation data useful to guide the vehicle to approach the storage location from an appropriate direction.

Figure 5:
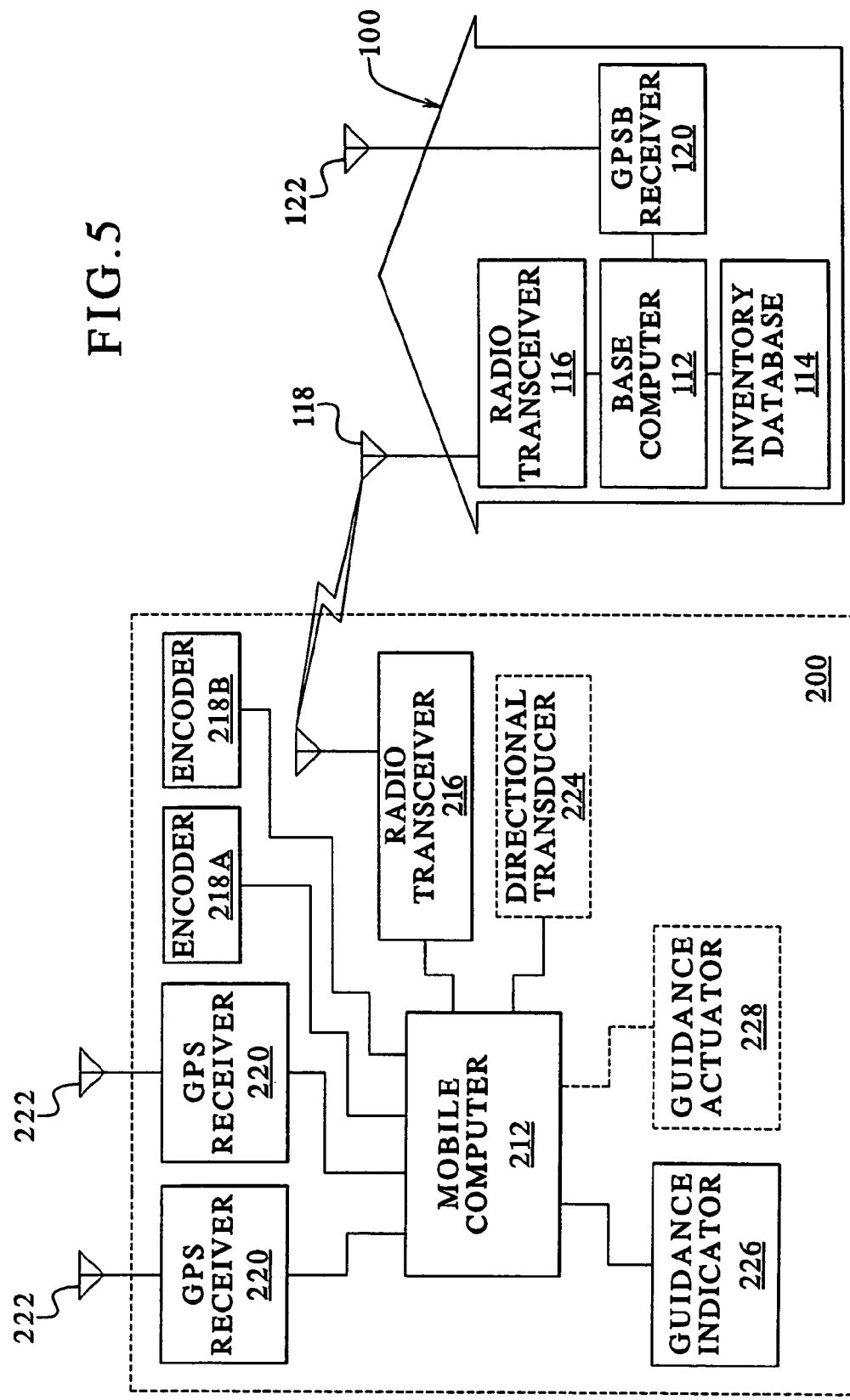
FIG. 5 is a schematic diagram of a system according to teachings of the present invention.

Referring to FIG. 5, a system is illustrated in which the base station 100 is equipped with a base computer 112 that has access to an inventory database 114. A two way radio, referred to herein as transceiver 116, and corresponding antenna 118 is provided through which the base computer 112 sends and receives RF signals. In an embodiment, a GPS receiver 120 and corresponding GPS antenna 122 are provided at the base station 100 to provide a reference GPS signal to the base computer 112.

At the left side of FIG. 5 is a schematic diagram of components carried on the vehicle 200. The load-handling vehicle is equipped with at least one mobile GPS receiver 220 having a corresponding GPS antenna 222. The vehicle 200 includes a mobile computer 212 that receives signals from the GPS receiver 220. Additionally, the vehicle includes a mobile two-way radio transceiver 216 through which the mobile computer sends and receives RF signals at a frequency corresponding to the base transceiver 116. The base and mobile radio transceivers 116, 216 facilitate communication between the base computer 112 and mobile computer 212 as the vehicle 200 maneuvers around the facility. To illustrate possible mounting locations for the GPS antenna 222, FIG. 2, for example, illustrates the vehicle 200A having a GPS antenna 222 mounted on top of the upper horizontal beam 204, and the vehicle 200B of FIG. 3 has a GPS antenna 222 mounted on top of a rearward portion of the chassis 260. The GPS antennae 122, 222 can be mounted in any position that affords suitable skyward exposure for reception from the GPS satellites 40 (FIG. 1).

The GPS data represents a position of the GPS antenna. The lifting device is movable relative to the main portion of the vehicle supported on the ground. Where the GPS antenna is mounted to the main portion of the vehicle, as in the illustrated embodiments, the GPS antenna does not indicate a precise location of the lifting device, because the lifting device is movable relative to the GPS antenna. In order to determine the precise position of the lifting device and an item held by the lifting device, the vehicle is also equipped with encoders that detect the position of the lifting device relative to a frame or chassis of the vehicle. The position of the lifting device (and an item held by lifting device) is determined by adjusting the GPS position to compensate for the position of the lifting device relative to the GPS antenna.

More specifically, as illustrated in FIG. 5, the vehicle 200 is equipped with one or more encoders 218A, 218B to measure movement of the lifting device and to provide a corresponding signal to the mobile computer 212, which determines the movement or position of the lifting device relative to the main portion of the vehicle.

Preferably separate encoders are provided for each degree of freedom of the lifting device. Separate encoders are provided for each degree of freedom. In an embodiment wherein the vehicle is a forklift type of side loader or packer, wherein the lifting device is vertically movable along the Z axis relative to the main portion, a single encoder may be sufficient for determining a supplemental Z distance of the lifting device relative to the GPS receiver. In a vehicle wherein the lifting device is movable in a side-to-side and/or front-to-rear direction, respective encoders are provided to measure supplemental X and Y distances of the lifting device with respect to the GPS receiver(s). The encoders may be any appropriate type of encoder or sensor for example, mechanical, magnetic, or optical, as are generally known. These encoders can, for example, measure the length of actuation of a cylinder, a feed distance of a cable, a degree of rotation of a hoist drum for coiling a cable, or an angle of a pivotal joint, or the degree of movement between any relatively movable structures.

In the vehicle 200A shown in FIG. 2, the vehicle is equipped with a first encoder (see 218A in FIG. 5) for measuring the horizontal position of the trolley 210 relative to the stabilizer beam 210 and a second encoder (see 218B in FIG. 5) for measuring a vertical position of the stabilizer beam relative to the columns 202. In the vehicle 200B of FIG. 3, a first encoder (see 218A in FIG. 5) measures an angle of the first boom portion 264A that is pivotally mounted to the chassis 260, and a second encoder (see 218B in FIG. 5) for measuring a relative slidable position of the telescoping second boom portion 264B relative to the first boom portion 264A.

One or more encoders 218A, 218B (FIG. 5) measure movement of the lifting device and provide a corresponding signal to the mobile computer 212, which determines the movement or position of the lifting device relative to the main portion of the vehicle. Separate encoders are provided for each degree of freedom. For example, in an embodiment wherein the vehicle is a forklift type of side loader or packer, wherein the lifting device is vertically movable relative to the main portion, the encoder determines a supplemental Z distance of the lifting device relative to the GPS receiver(s). In a vehicle wherein the lifting device is movable in a side-to-side and/or front-to-rear direction, respective encoders are provided to measure supplemental X and Y distances of the lifting device with respect to the GPS receiver(s). The encoders may be any appropriate type of encoder or sensor for example, mechanical, magnetic, or optical, as are generally known. These encoders can, for example, measure the degree of actuation of a cylinder or a feed distance of a cable.

Referring again to FIG. 5, in an embodiment wherein the GPS receiver 120 and corresponding antenna 122 are located at the base station 100, the signal from the base GPS receiver 120 is sent to the base computer 112 to be used as a reference calibration that can be used to more precisely determine the position of the vehicle 200. In particular, the base computer 112 can be programmed to compare the currently measured position of the antenna of the base GPS receiver 120 to a known, fixed reference position of the antenna 122, from which a vector can be calculated to represent the difference between the known and measured positions. Assuming that a similar difference between measured and actual positions currently affects the mobile GPS receivers 220, the vector is applied to correct the position measured by the mobile GPS receivers 220 for improved precision.

Figure 4:
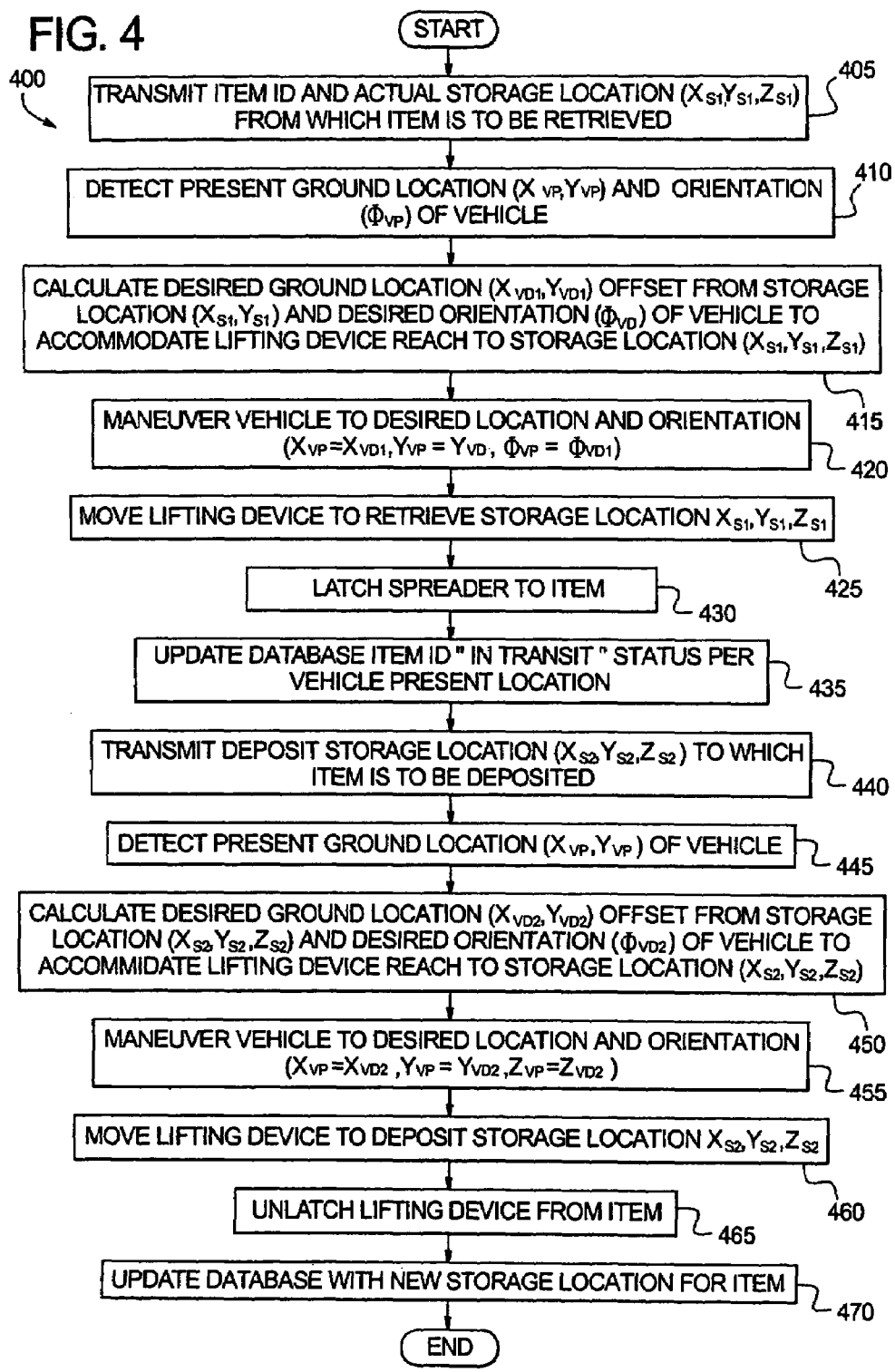
FIG. 4 is a flow chart illustrating an exemplary process for managing an inventory according to teachings of the present invention.

FIG. 4 is a flow chart illustrating an exemplary process 400 for managing an inventory according to teachings of the present invention. Generally, steps of the process 400 result in moving an item from a first storage location $X_{S1}$ $Y_{S1}$ $Z_{S1}$ to a second storage location $X_{S2}$ $Y_{S2}$ $Z_{S2}$.

At step 405, item identification information and an actual storage location $X_{S1}$ $Y_{S1}$ $Z_{S1}$ are transmitted to the vehicle. With reference to FIG. 5, the item identification and actual storage location information are input to the base computer 112 and transmitted via an RF signal from base transceiver 116. The base computer 112 obtains the item identification and actual storage location data from the inventory database 112 or by user input. The data is received by the mobile transceiver 216 on board the vehicle 200 and is sent to the mobile computer 212. Alternatively, the item identification and storage location $X_{S1}$ $Y_{S1}$ $Z_{S1}$ could be entered into the mobile computer by an operator of the vehicle.

As indicated at step 410 of FIG. 4, a present ground location $X_{VP}$ $Y_{VP}$ is detected, and in an embodiment, a present orientation $\Phi_{VP}$ of the vehicle is additionally detected. As discussed above, in connection with FIG. 5, the present ground location of the vehicle is preferably determined using a GPS signal received from the GPS receiver 220 and antenna 222 on the vehicle 200. In an embodiment, another factor in determining the position of an item is data representing the orientation of the loading vehicle. The present orientation of the vehicle can be determined using various techniques. For example, the vehicle may be equipped with a second GPS receiver 220 having an antenna 222 mounted in a laterally spaced relation from the first GPS antenna.

The present ground position of the vehicle $X_{VP}$ $Y_{VP}$ may be the current X, Y position of one of the mobile GPS antennas 222, as illustrated in the examples of FIGS. 2 and 3. However, those of ordinary skill in the art will recognize the possible convenience of adjusting the GPS position by known values particular to the vehicle so that the present ground position $X_{VP}$ $Y_{VP}$ represents a different point on the vehicle such as the geometric center of the vehicle or any other point. For example, with reference to FIG. 7, the present ground location of the vehicle $X_{VP}$ $Y_{VP}$ is defined at the center of the vehicle 200A. The mobile computer 212 (FIG. 5) determines the center $X_{VP}$ $Y_{VP}$ based on predetermined dimensions of the vehicle and its orientation $\Phi_{VP}$ by adjusting the GPS coordinates of the GPS receiver by a corresponding vector.

The present orientation $\Phi_{VP}$ of the vehicle can be determined in various ways. In an embodiment wherein the vehicle is equipped with multiple GPS receivers 220, the mobile computer 212 can calculate the orientation of the vehicle based on the different positions sensed by the first and second GPS receivers 220. Alternatively, the present vehicle orientation $\Phi_{VP}$ may be determined by other appropriate means, such as a compass, gyroscope, or another suitable directional transducer, particularly in a system wherein the vehicle includes a single GPS receiver.

Figure 7:
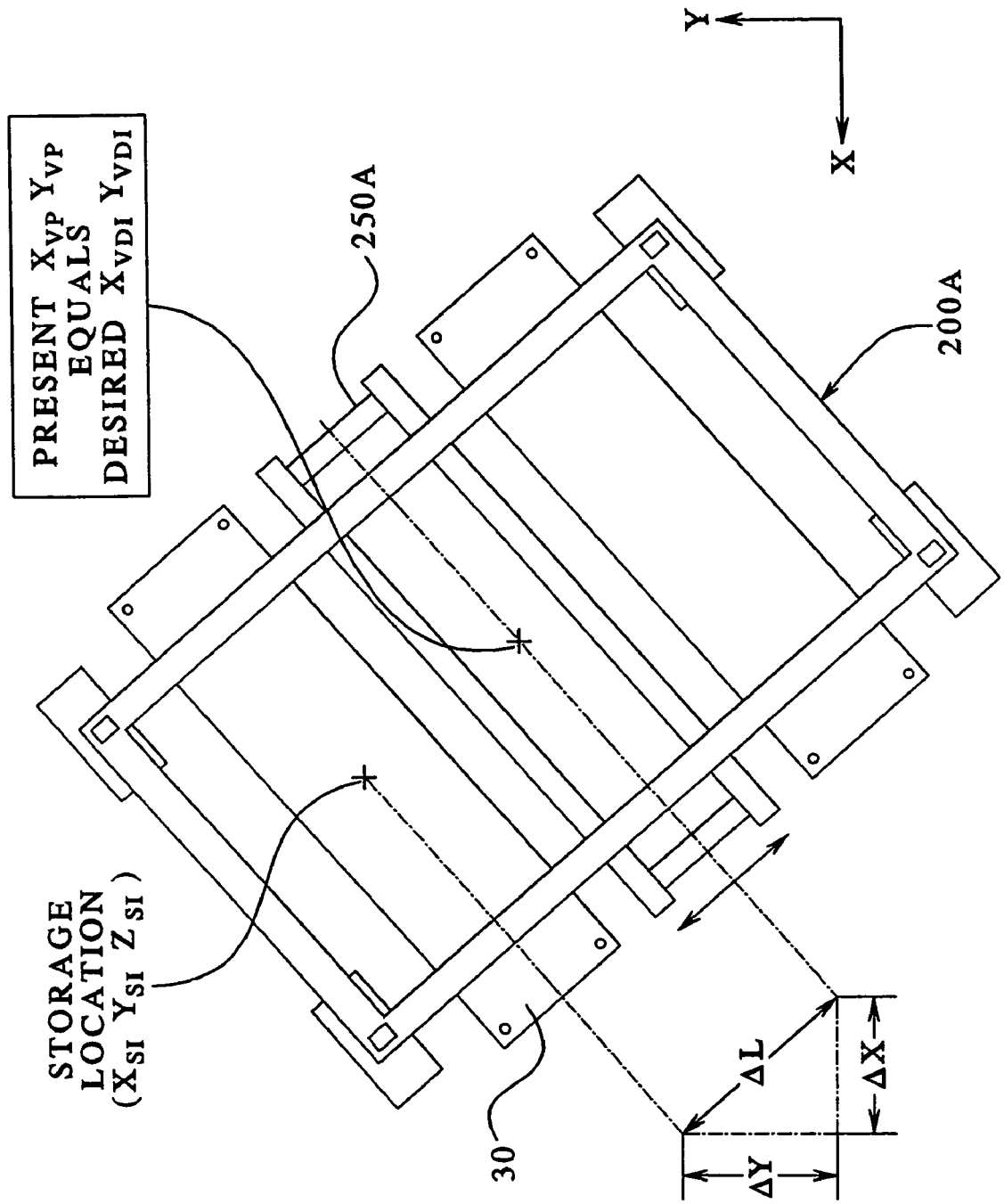
FIG. 7 is a schematic plan view of a vehicle parked at a desired ground position wherein the lifting mechanism must be moved a lateral distance ΔL to latch the item located at the actual storage location position $X_{S1}$, $Y_{S1}$, $Z_{S1}$.

Referring back to FIG. 4, step 415 optionally calculates a desired ground location $X_{VD1}$, $Y_{VD1}$ of the vehicle that is offset from the ground storage location $X_{S1}$, $Y_{S1}$. The desired offset position $X_{VD1}$, $Y_{VD1}$ depends on the type of vehicle, lifting device and corresponding item being lifted. For example, the side loader style vehicle 200B to FIG. 3 needs to be parked at a laterally offset position beside a container storage location in order to properly position the lifting device 250B to meet the top of the item 30. In FIG. 3, for example, the offset is indicated as $\Delta X$, as the vehicle happens to be aligned on the X axis as illustrated. Referring to FIG. 7, the offset is indicated as $\Delta L$, which has components $\Delta X$ and $\Delta Y$ along the X and Y axes. In FIG. 7, the desired offset is laterally under the gantry style vehicle 200A in order to allow the vehicle to concurrently straddle multiple stacks of items.

Figure 6:
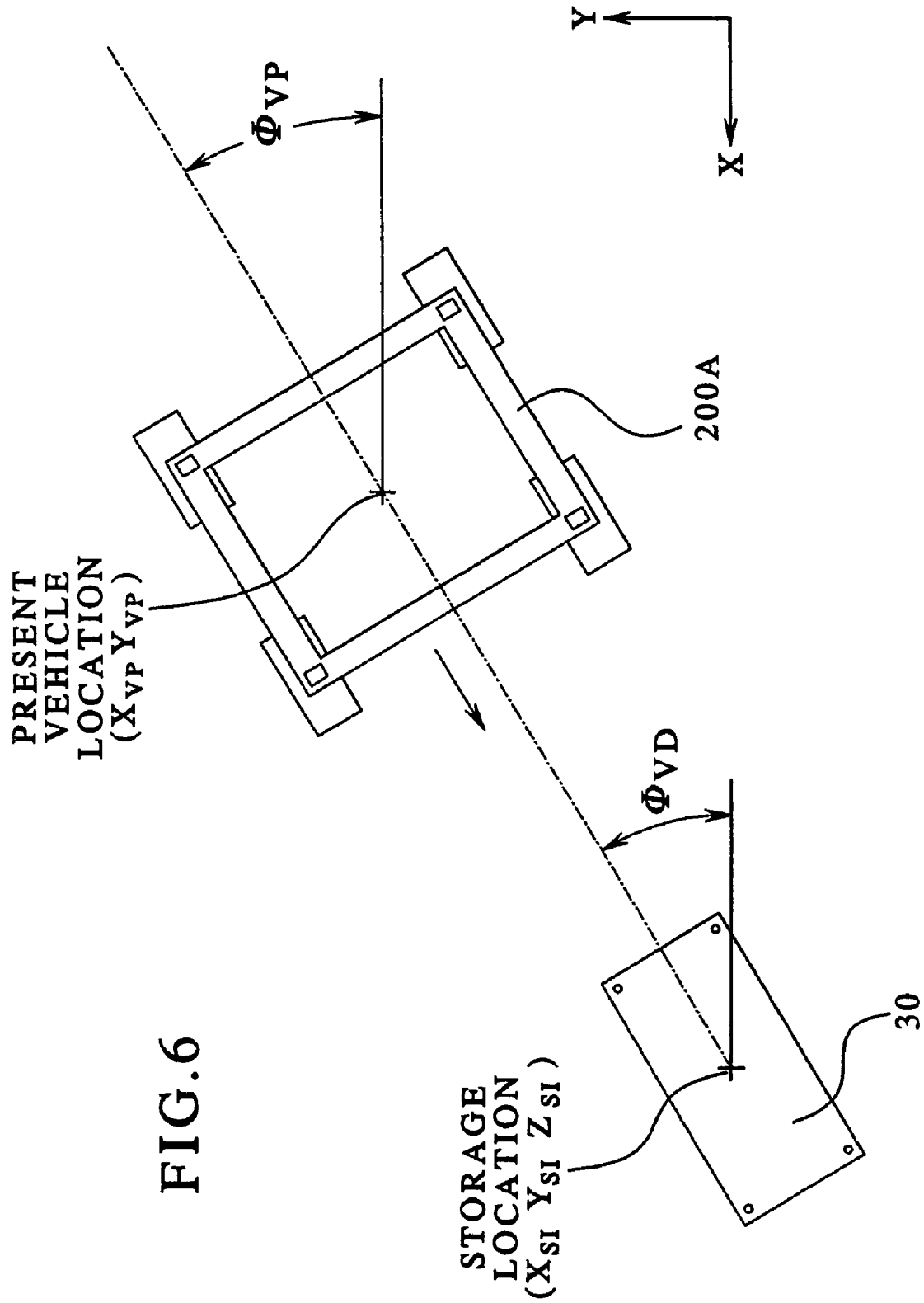
FIG. 6 is a schematic plan view of a vehicle approaching an item to be retrieved, the crane having present vehicle orientation $\Phi_{VP}$ that matches a desired vehicle orientation $\Phi_{VD}$.

In step 415, a desired orientation is also calculated. In an embodiment, it is desirable for the vehicle to approach the item storage location from a particular angle or orientation. The approach orientation can be necessary for access to the item, depending on the configuration of the vehicle with respect to the item 30 and the available free areas on pavement near the item. For example, with respect to FIG. 6, it is desirable for the vehicle 200A to be aligned at a vehicle orientation $\Phi_{VP}$ to approach the item 30 along the orientation $\Phi_{VD}$ of the item 30. In FIG. 6, the vehicle 200A is a gantry crane, and the item is a shipping container. Because this vehicle 200A must straddle the item 30 in order to land the lifting device on the container, it is desirable that the vehicle approaches the item from an orientation aligned longitudinally with the item 30. In a situation wherein the side loader vehicle 200B is used, the desired orientation $\Phi_{VD}$ of the item 30 would be perpendicular the orientation illustrated in FIG. 6, because the side loader is structurally configured to lift a shipping container from the side. Orientation data may be unnecessary in a system wherein the orientation of the vehicle is constant, such as for loading vehicles that move on rails or in manual systems wherein the final approach relies upon the judgment of the driver as to the best approach direction. The desired orientation $\Phi_{VD}$ can be calculated by the base computer 112 or the mobile computer according to stored parameters, including the storage orientation of the device, the vehicle configuration, predetermined pathways between obstacles or multiple items.

In FIG. 4, reference numeral 420 indicates the step of maneuvering the vehicle to the desired location and orientation that were calculated in step 415. When the vehicle is at the desired location, the ground position and orientation of the vehicle $X_{VP}$, $Y_{VP}$, $\Phi_{VP}$ match, within an appropriate range of tolerance, the desired ground position and orientation of the vehicle $X_{VD1}$, $Y_{VD1}$, $\Phi_{VD1}$. According to various embodiments, the maneuvering step 420 can be automatic, manual, or a combination of manual and automatic maneuvering. For example, the vehicle can be equipped with a guidance indicator 226 (FIG. 5) to display directions to a human operator for driving and steering the vehicle 200 to the desired location. Optionally, the vehicle 200 is equipped with guidance actuator 228 (FIG. 5) that is adapted to control the drive and steering of the vehicle automatically to the desired ground location at the desired orientation.

When the vehicle has arrived at the desired ground position, the lifting device is then moved to the storage location $X_{S1}$, $Y_{S1}$, $Z_{S1}$, as indicated at step 425 of FIG. 4. For example, with respect to the gantry crane style vehicle 200A of FIG. 2, the lifting device may be moved to the storage location by moving the trolley 210 and stabilizer beams 208 as necessary to vary the position of the suspended grappler or lifting device 250A. As FIG. 7 schematically illustrates, the lifting device would have to be moved laterally a distance of $\Delta L$ in order to be properly positioned to land on top of the container 30. On the side loader style vehicle 200B of FIG. 3, the lifting device is moved by adjusting the angle and telescoping length of the boom 264. Notably, the lifting device must be moved to an appropriate vertical position on the Z axis according to the height of an item 30 or according to the vertical position of an item that sits on a stack or which resides in a rack in a stacked relation to other items. When the lifting device 250 is properly positioned relative to the item 30 to be lifted, the lifting device is latched to the item as indicated at step 430 in FIG. 4. Where the lifting device 250 is a grappler, as in the illustrated examples, the twistlocks are rotated to the latched position within the receptacles of the container.

In an embodiment, the system keeps track of whether an item is in a stationary mode for storage or in transit. For example, the system determines whether a container is "unlatched" or "latched" with respect to a grappler of the loading vehicle. A signal associated with an actuator of the latches or a latch sensor may be used to provide a corresponding signal, as will be recognized by those skilled in the art. Preferably, as indicated at step 435 of FIG. 4, the mobile computer 212 signals the base computer 112 to indicate that the represents that the item 30 is "in transit" due to the latched condition of the lifting device, and it is assumed that the position of the item 30 can be tracked along with the present location of the vehicle. The base computer 112 preferably updates the database to reflect that the particular item 30 is no longer located at its storage location $X_{S1}$, $Y_{S1}$, $Z_{S1}$ and that it is now carried by the vehicle. If the container is latched, the position of the container is being moved to a destination location, and the system stores an updated position for the container where it is deposited at the moment it is "unlatched" from the loading vehicle.

As indicated at step 440, a new storage location $X_{S2}$, $Y_{S2}$. $Z_{S2}$, is provided to the mobile computer 212 to which the item is to be moved and deposited. The storage location $X_{S2}$, $Y_{S2}$ $Z_{S2}$ can be transmitted to the mobile computer 212 from the base computer 112 at the base station 100, or alternatively, the storage location storage location $X_{S2}$, $Y_{S2}$, $Z_{S2}$, could be input by an operator aboard the vehicle.

At step 445, the present vehicle ground location $X_{VP}$ $Y_{VP}$ of the vehicle is determined in a manner as discussed above in connection with step 410. By periodically updating the present ground location $X_{VP}$ $Y_{VP}$, the vehicle is tracked by the mobile computer 212 and/or the base computer 112. At step 450, a desired offset ground location $X_{VD2}$, $Y_{VD2}$ of the vehicle is calculated relative to the storage location $X_{S2}$, $Y_{S2}$, $Z_{S2}$ in the manner discussed above in connection with step 415.

As indicated at step 455, the vehicle is maneuvered to the desired location so that the present vehicle position $X_{VP}$ $Y_{VP}$ matches the desired vehicle position $X_{VD2}$, $Y_{VD2}$, within a suitable range of tolerance, as discussed above in connection with step 420. The maneuvering step 455 may be manually directed by the operator with the assistance of the guidance indicator 226 (FIG. 5), or the maneuvering may be partially or fully automated with the assistance of the guidance actuator 228 (FIG. 5).

When the vehicle is parked at the desired vehicle ground location, $X_{VD2}$, $Y_{VD2}$, the lifting device is moved to place the item 30 at rest at the desired storage location $X_{S2}$, $Y_{S2}$, $Z_{S2}$. This requires movement of the lifting device as discussed above in connection with step 425. When the item is properly positioned, the lifting device 250 is unlatched from the item 30, as indicated by step 465. For example, in the example wherein the lifting device is a grappler, as illustrated in FIGS. 2 and 3, the twistlocks are moved to an unlatched position to release the grappler from the container. The mobile computer 212 transmits a signal to the base computer 112 that the item 30 has been unlatched, and accordingly, the base computer 112 updates the database to reflect that the particular item corresponds to the new storage location $X_{S2}$, $Y_{S2}$, $Z_{S2}$ where it was just deposited. While the container is "unlatched," the system stores a record of the position of the container, which remains stationary at a position last deposited (switched from "latched" to "unlatched") by the vehicle.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method for managing an inventory comprising:
   providing a database storing item identification information for a plurality of respective items and three dimensional storage location for each of the respective items;
   transmitting the storage location information and the item identification information to a vehicle having a lifting mechanism operable to selectively handle at least one of the items;
   determining a desired position and orientation of the vehicle to provide access to the storage location;
   detecting a present ground position of the vehicle;
   detecting an orientation of the vehicle;
   comparing the present ground position and orientation information to the desired ground position and orientation information;
   automatically steering the vehicle along a desired land travel path that can include at least one curved portion so that the present position and orientation matches the desired ground position and orientation information;
   detecting a vertical position of the lifting mechanism;
   moving the lifting mechanism of the vehicle to a vertical coordinate and horizontal coordinates associated with the storage location; and
   updating the database to reflect changes to the item identification information and location information to reflect retrieval or deposit of an item from the storage location.

2. The method of claim 1, wherein the desired ground position is the storage location.

3. The method of claim 1, further comprising the step of calculating a desired ground position of the vehicle that is offset from the storage location such that the lifting mechanism of the vehicle is positioned to reach the storage location when the vehicle is at the desired ground position.

4. The method of claim 1, wherein the storage location information includes orientation information used to determine a desired orientation of the vehicle that permits access to the storage location.

5. The method of claim 1, wherein the step of detecting a ground position includes receiving a GPS signal.

6. The method of claim 1, whereby said retrieval or deposit operation is determined by a respective unlatching or latching of the lifting mechanism with respect to the respective item.

7. The method of claim 1, whereby the lifting mechanism is selectively operable in a secured mode in which the lifting mechanism is secured to the item and a free mode in which the lifting mechanism is free from the item, and whereby the method further comprises transmitting a signal indicating whether the lifting mechanism is in the secured mode.

8. The method of claim 7, whereby the updating step includes storing assigning location information to an item at a location at which the item is released from the lifting mechanism.

* * * * *